(12) United States Patent
Bartels et al.

(10) Patent No.: US 7,945,366 B2
(45) Date of Patent: May 17, 2011

(54) MOTOR VEHICLE TRANSMISSION CONTROL FOR OPERATING A MOTOR VEHICLE TRANSMISSION

(75) Inventors: Ulrich Bartels, Stuttgart (DE); Manfred Guggolz, Rutesheim (DE); Werner Hillenbrand, Neuffen (DE); Erwin Schneeberger, Graz (AT)

(73) Assignee: Daimler, AG, Stuttgart (DE)

( * ) Notice: Subject to any disclaimer, the term of this patent is extended or adjusted under 35 U.S.C. 154(b) by 896 days.

(21) Appl. No.: 11/901,468

(22) Filed: Sep. 17, 2007

(65) Prior Publication Data

US 2008/0109143 A1    May 8, 2008

Related U.S. Application Data

(63) Continuation-in-part of application No. PCT/EP2006/060797, filed on Mar. 16, 2006.

(30) Foreign Application Priority Data

Mar. 17, 2005  (DE) .......................... 10 2005 012 308

(51) Int. Cl.
*G06F 19/00*    (2006.01)
(52) U.S. Cl. ............................. 701/67; 701/56; 192/3.55

(58) Field of Classification Search .................... 701/51, 701/55, 56, 58, 64, 66, 67, 68; 192/3.55, 192/3.61, 3.63; 74/335, 339
See application file for complete search history.

(56) References Cited

U.S. PATENT DOCUMENTS

| 6,769,523 | B2 | 8/2004 | Muetzel et al. |
| 7,377,374 | B2 * | 5/2008 | Buchhold ................. 192/3.55 |
| 7,827,876 | B2 * | 11/2010 | Guggolz et al. ............. 74/335 |

FOREIGN PATENT DOCUMENTS

| DE | 197 09 419 | 10/1997 |
| DE | 197 31 842 | 1/1998 |
| DE | 101 55 459 | 5/2002 |
| EP | 0 431 677 | 6/1991 |
| EP | 0 512 727 | 11/1992 |

\* cited by examiner

*Primary Examiner* — Richard M. Camby
(74) *Attorney, Agent, or Firm* — Klaus J. Bach

(57) ABSTRACT

In a control for a motor vehicle transmission having a clutch and means for establishing and/or releasing an engagement of a toothing or of jaws of the motor vehicle transmission including a control unit for actuating the clutch for transmitting a torque to a first component of the toothing, the control unit being adapted, for the purpose of releasing a tooth-on-tooth position of the toothing, to briefly provide a control signal for adjusting the clutch to a desired clutch position ($K_S$) in order to generate a torque pulse, the control unit determining a reaction of the motor vehicle transmission in response to the control signal from the control unit and adapting the desired clutch position ($K_S$) as a function of the reaction.

11 Claims, 3 Drawing Sheets

MOTOR VEHICLE TRANSMISSION CONTROL FOR OPERATING A MOTOR VEHICLE TRANSMISSION

This is a Continuation-In-Part Application of pending international patent application PCT/EP2006/060797 filed Mar. 16, 2006 and claiming the priority of German Patent Application 10 2005 012 308.2 filed Mar. 17, 2005.

BACKGROUND OF THE INVENTION

The invention relates to a motor vehicle transmission control for operating a motor vehicle transmission including a control unit for actuating a clutch for the release of a toothed engagement of transmission components.

U.S. Pat. No. 6,769,523 B2 discloses a motor vehicle transmission control device which comprises a means for making and/or releasing an engagement of a toothing of a motor vehicle transmission. Furthermore, the motor vehicle transmission control device has a control unit for actuating a clutch, the clutch being suitable for transmitting a torque to a first component of the toothing. The control unit is intended, by suitable programming, for briefly adjusting the clutch, for the purpose of releasing a tooth-on-tooth position of the toothing, into at least one stored desired clutch position in which the clutch transmits a low torque pulse to the first component of the toothing. For this purpose, the control unit increases the desired clutch position in steps until the clutch engages and until the tooth-on-tooth position is released.

It is the object of the present invention to provide a device, by means of which a tooth-on-tooth position of a component engagement toothing of a transmission can be released particularly quickly and without any losses of comfort.

SUMMARY OF THE INVENTION

In a control for a motor vehicle transmission having a clutch and means for establishing and/or releasing an engagement of a toothing or of jaws of the motor vehicle transmission including a control unit for actuating the clutch for transmitting a torque to a first component of the toothing, the control unit being adapted, for the purpose of releasing a tooth-on-tooth position of the toothing, to briefly provide a control signal for adjusting the clutch to a desired clutch position ($K_S$) in order to generate a torque pulse, the control unit determining a reaction of the motor vehicle transmission in response to the control signal from the control unit and adapting the desired clutch position ($K_S$) as a function of the reaction.

The control unit adapts the stored desired clutch position automatically to reflect the wear of the clutch and/or to other variable factors. An approach to an optimal desired clutch position in steps can advantageously be at least shortened, so that a detected tooth-on-tooth position can be released quickly. Furthermore, it can be ensured that the intensity of the transmitted torque pulse is always close to a minimal intensity necessary for establishing engagement of the toothing, so that an uncomfortable and wear-promoting jolt of the motor vehicle transmission can be avoided. Shift comfort can thereby be increased.

A torque pulse can be achieved by means of a time-limited closing of the clutch, and a time integral with respect to the amount of the transmitted torque is to be designated as the "intensity" of the torque pulse. An adaption of the desired clutch position or of a characteristic quantity for this takes place by means of a variation of a stored value or basic value for the desired clutch position and involves a permanent storage of the changed value until its next variation. If the control unit utilizes a train of torque pulses having different intensities and desired clutch positions, both the intensity of an individual pulse and the intensity of all the pulses can be subjected to adaptive matching. Adaption may take place constantly during the normal operation of a motor vehicle comprising the motor vehicle transmission control device or in separate adaption operation which may always be carried out, for example, immediately after an ignition of a drive assembly. The means may be actuable, for example, manually, hydraulically, pneumatically or electromagnetically. The motor vehicle trans-mission control device can, at least in parts, also regulate the operation of the motor vehicle transmission.

In a particular embodiment of the invention, the control unit increases in steps the desired clutch position assigned to a torque pulse, until the reaction signal from the motor vehicle transmission overshoots a threshold value. In this way, the tooth-on-tooth position is released reliably by a successful torque pulse without loss of comfort due to a jolt.

If the motor vehicle transmission control device comprises a storage unit for storing a clutch travel, occurring when the threshold value is overshot, or a characteristic quantity for a clutch travel, the control unit can utilize the stored clutch travel as an adapted desired clutch position for releasing the next tooth-on-tooth position. A pre-mature matching of the stored desired clutch position can be avoided if the adaption utilizes a plurality of release actions or the clutch travel distance resulting in the release actions is relatively large.

Furthermore, it is proposed that the control unit determines an amount of the torque pulse as a function of an operating state of the motor vehicle transmission. As an amount of the torque pulse, its length and its height may be considered, the height being adjustable via the desired clutch position. A distinction may advantageously be made between stationary operation, test operation and drive operation of the motor vehicle, while, particularly in stationary operation, the torque pulse should be metered particularly carefully in order to avoid an unwanted propulsion of the motor vehicle. In order, in test operation, to make it possible to determine exactly the desired clutch position or a "kiss point" of the clutch, steps increase should in this case be particularly low. This can be achieved when the control unit is provided for determining a quantity or a value of a step increase as a function of an operating state of the motor vehicle transmission. Particularly in a safety mode, the step increase may advantageously assume a reduced value, that is to say a value which is lower than the values selected in normal operation. By an adaption of the desired clutch position in a safety mode, a jolt accompanied by losses of comfort can be avoided during adaption operation.

An adaptive grip point of the clutch, used for controlling the clutch, may advantageously be utilized to make it easier to determine the desired clutch position. However, the grip point is different from the desired clutch position, since there is already at the grip point an excessive frictional connection between friction bodies of the clutch.

Faulty adaption, which may occur, for example, due to a malfunction of an actuator actuating the clutch, can be avoided if the control unit evaluates a test value of the desired clutch position as a function of the reaction signal from the motor vehicle transmission. Incorrectly activated torque pulses can thereby be detected.

An especially accurately activated torque pulse can be achieved when the control unit is provided for detecting a temperature of the clutch and for correcting the desired clutch position as a function of the detected temperature.

A control unit always adapted effectively to a wear of the clutch can be ensured even when adaption does not appear to be possible during operation on account of absent and/or too short idling phases, if the control unit is provided for adapting the desired clutch position automatically in a test operation. The control unit can particularly advantageously always commence the test operation immediately after a start of the motor vehicle.

Furthermore, the invention proceeds from a method for actuating a motor vehicle transmission having a means for making and/or releasing an engagement of a toothing of the motor vehicle transmission, a clutch being actuated via a control unit, the clutch being suitable for transmitting a torque to a component of the toothing, and, for the purpose of releasing a tooth-on-tooth position of the toothing, the clutch being briefly adjusted, that is to say for about 100-500 ms, into a desired clutch position in order to generate a torque pulse.

It is proposed that a reaction signal from the motor vehicle transmission in response to a control signal from the control unit is detected, and the desired clutch position is adapted as a function of the reaction signal. A rapid release of a tooth-on-tooth position can thereby be achieved without loss of comfort.

The invention and advantages thereof will become more readily apparent from the following description of an exemplary embodiment on the basis of the accompanying drawings:

DESCRIPTION OF A PARTICULAR EMBODIMENT

Figure 1:
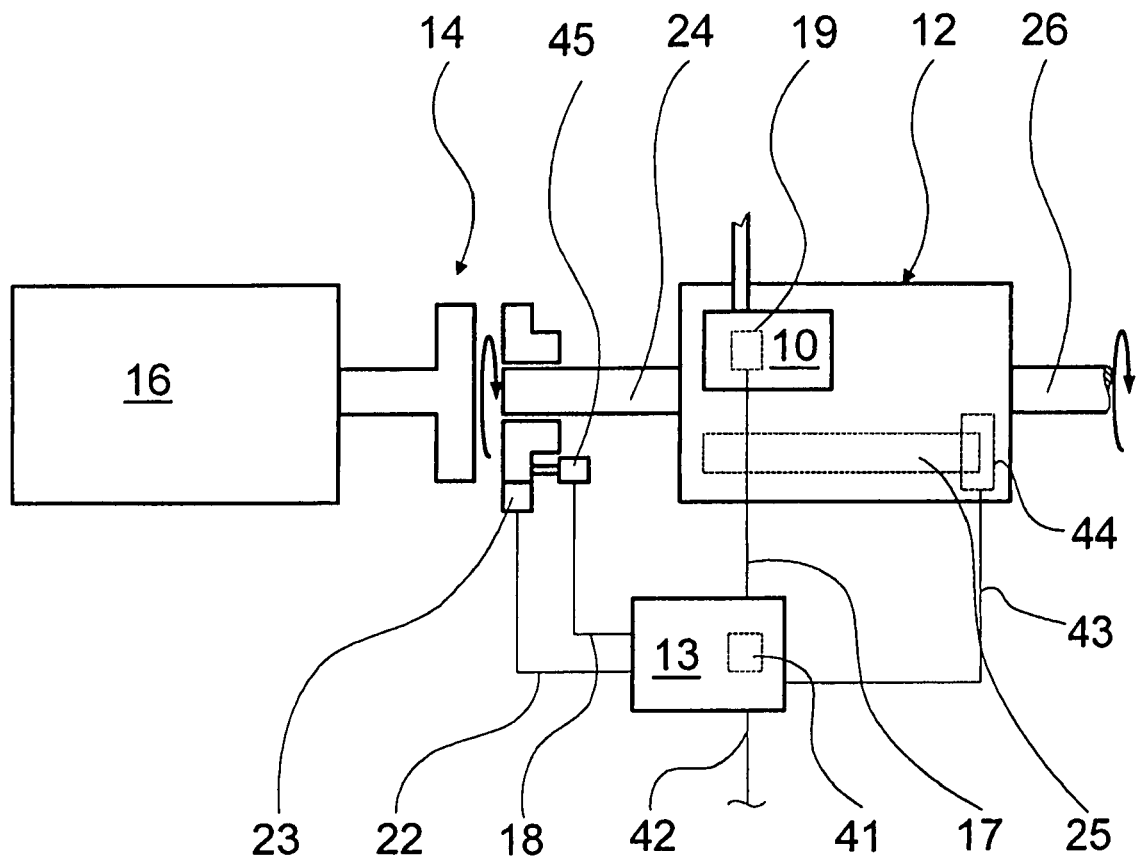
FIG. 1 shows a drive train of a motor vehicle with a motor vehicle transmission, with a clutch and with a motor vehicle transmission control device.
Figure 2:
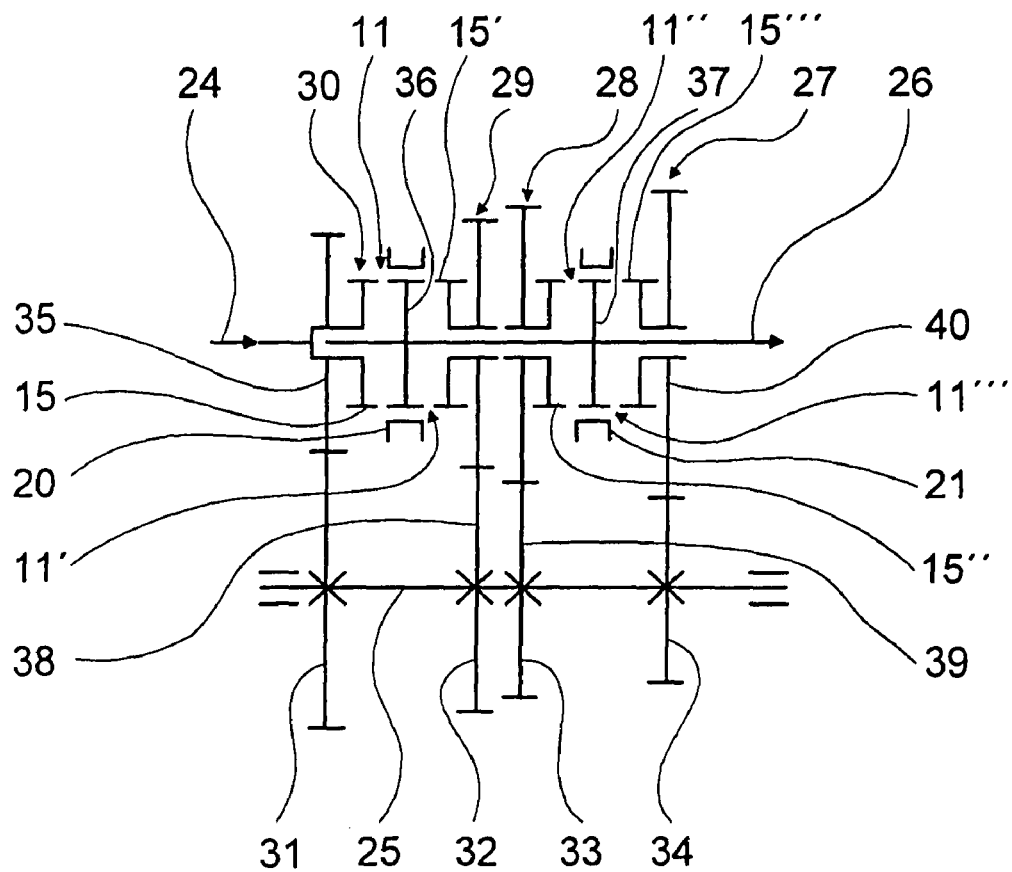
FIG. 2 shows diagrammatically a transmission the motor vehicle transmission of FIG. 1.

FIG. 1 shows a drive train of a motor vehicle in a diagrammatic illustration. The drive train comprises an internal combustion engine 16, a motor vehicle transmission 12 designed as an unsynchronized jaw clutch transmission, and a clutch 14 which is disposed between the internal combustion engine 16 and the motor vehicle transmission 12 and which can provide for, and interrupt, a torque transmission between the internal combustion engine 16 and the motor vehicle transmission 12. The motor vehicle transmission 12 is equipped with a control unit 13 which communicates via a sensor line 17 with a sensor 19 which detects a position of shift forks 20, 21 or of a manually actuable shift roller of the motor vehicle transmission 12. (FIG. 2). The shift roller forms a means 10 for making and releasing an engagement of toothings 11-11''' of the motor vehicle transmission.

The control unit 13 is capable of actuating, via a control line 18, an actuator 45 of the clutch 14. Furthermore, the control unit 13 detects, via a sensor line 22 and a sensor 23, a temperature of the clutch 14 and a clutch travel actually set on the clutch 14, that is to say an axial position of a part of the clutch 14 which is mounted displaceably on a shaft.

The motor vehicle transmission 12 comprises an input shaft 24, from which it transmits a torque via a countershaft 25 to an output shaft 26 which is connected to wheels of a motor vehicle comprising the drive train. The motor vehicle transmission 12 has four gears 27-30 and one reverse gear, not illustrated here.

The control unit 13 detects a rotational speed of the countershaft 25 via a further sensor line 43 and a sensor 44.

Four gearwheels 31-34 are connected fixedly to the countershaft 25. The gearwheel 31 meshes constantly with a gearwheel 35 connected fixedly to the input shaft 24, while the gearwheels 32-34 in each case mesh constantly with a gearwheel 38-40 connected axially fixedly, but rotatably, to the output shaft 26.

The shift forks 20, 21 engage in each case into an outer groove of a shift ring 36, 37 connected fixedly in terms of rotation, but axially displaceably, to the output shaft 26, so that the shift rings 36, 37 can be displaced axially on the output shaft 26 via the shift forks 20, 21. The shift rings 36, 37 have on both axial sides a peripheral row of jaws which, by the axial displacement of the shift rings 36, 37, can be brought in one direction or the other into positive engagement with a corresponding jaw structure on one of the gearwheels 34, 38-40, the jaw structure forming a component 15-15''' of a toothing 11-11'''.

When the shift rings 36, 37 are displaced in order to bring the toothings 11-11''' into engagement, it may happen that the jaws of the shift rings 36, 37 come to bear on the jaws of the gearwheels 34, 38-40, instead of sliding into interspaces between the jaws, as is necessary for making engagement. There is then a tooth-on-tooth position. The control unit 13 detects the tooth-on-tooth position in that the signal from the sensor 19 does not reach a desired value.

To release the tooth-on-tooth position, the control unit 13 then starts a sequence which is implemented as a program in the control unit 13 and in which the control unit 13 briefly adjusts the clutch 14, via the control line 18 and the actuator 45, into a desired clutch position $K_S$, in which the frictional elements of the clutch 14 slightly touch one another and in which the clutch 14 transmits a torque pulse directly or via the countershaft 25 to the components 15-15''' of the toothings 11-11'''. As a result, the jaw structures of the toothing 11-11''' lying tooth on tooth are slightly rotated with respect to one another, until the jaw structure of the corresponding shift ring 36, 37 slides into the component 15-15''', connected to the corresponding gearwheel 34, 38-40, of the toothing 11-11''', and the toothing 11-11''' is engaged.

An actual configuration of the sequence depends on an operating state of the motor vehicle transmission 12 or of the motor vehicle comprising the motor vehicle transmission 12.

Figure 3:
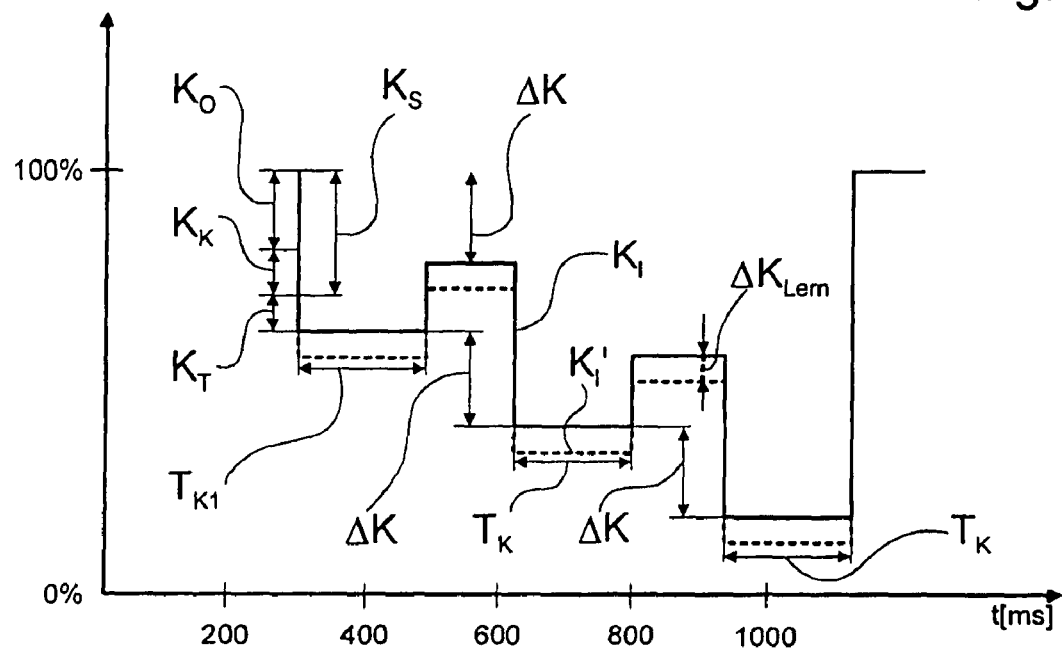
FIG. 3 shows a time profile of an activated clutch travel during an operation for determining a desired clutch position in order to generate a torque pulse when the motor vehicle is stationary.

FIG. 3 shows the time profile of the desired clutch travel $K_I$ activated via the actuator 45, during a sequence for determining the desired clutch position $K_S$ when the motor vehicle is stationary. The sequence serves for releasing a tooth-on-tooth position detected via the sensor 19. The control unit 13 starts the illustrated sequence each time after a tooth-on-tooth position has been detected. First, the clutch 14 is opened, and the input shaft 24, the countershaft 25 and the output shaft 26 are at a standstill. To start the sequence, the control unit 13 reads a stored value of the desired clutch position $K_S$ out from a storage unit 41 of the control unit 13. The stored desired clutch position $K_S$ is composed of a basic value $K_0$ and a correction value $K_K$:

$$K_S = K_0 + K_K.$$

Subsequently, the control unit 13, via the sensor 23, determines the temperature of the clutch 14 and reads out a temperature addition $K_T$ from a characteristic map stored in the storage unit 41. The clutch 14 then closes quickly until the clutch travel is equal to the sum of the desired clutch position $K_S$ and the temperature addition $K_T$. After a pulse duration $T_{K1}$ of about 215 ms stored in the storage unit has elapsed, the control unit 13 moves the clutch 14 back to a desired clutch travel $K_I$ with a value $\Delta K$ and consequently terminates a first pulse. If the friction bodies of the clutch 14 have touched one another, and if a torque pulse has thereby been transmitted to the countershaft 25 and the components 15-15''' which has released the tooth-on-tooth position, the control unit 13 discontinues the sequence. If, by contrast, the control unit 13 also continues to detect a tooth-on-tooth position by means of the sensor 19, the control unit 13 generates a pulse, similar to the first pulse and higher by the value $\Delta K$, with a pulse duration $T_K$ of 200 ms, stored in the storage unit 41.

The height of the pulses is subsequently increased in steps in each case by the value $\Delta K$ until the tooth-on-tooth position is released and a gear is engaged, until a driver discontinues the shift operation, until the control unit 13 receives a discontinuation signal via a CAN bus 42, or until a maximum number of pulses or a maximum desired clutch travel $K_I$ is reached.

If the tooth-on-tooth position has not been released by means of the first pulse, but by means of a further pulse, or if the control unit 13 detects a torque pulse on the countershaft 25 via the sensor 44 after one of the further pulses or during one of the further pulses, the control unit 13 increases the correction value $K_K$ by a multiple of an increment $\Delta K_{Learn}$, so that, at a next start of the sequence, the desired clutch position $K_S$, minus the temperature addition $K_T$, is increased slightly, as compared with the current sequence. FIG. 3 illustrates as a dashed line an adapted clutch travel $K_I'$, in which the correction value $K_K$ has been increased by the increment $\Delta K_{Learn}$. If N is the number of pulses required for releasing the tooth-on-tooth position, the varied correction value $K_K'$ amounts to:

$$K_K' = K_K + (N-1)\Delta K_{Learn}.$$

The control unit 13 thereby adapts the desired clutch position $K_S = K_0 + K_K'$ as a function of a reaction signal detected by the sensor 19. The reaction signal is triggered by a control signal from the control unit 13 which is sent to the actuator 45. The control unit 13 thereby learns an optimized new desired clutch position $K_S$ which is adapted to a wear of the clutch 14.

The control unit 13 detects the torque pulse by means of a positive gradient of the rotational speed of the countershaft 25 and by means of a positive overall change in the rotational speed during the sequence. The overall change must exceed a stored threshold value.

If, after the release of the tooth-on-tooth position by means of the first pulse, the control unit 13 detects oscillations in the signal from the sensor 44 or in the rotational speed of the countershaft 25, the control unit 13 recognizes that the torque pulse was too high and reduces the desired clutch position $K_S$ or the correction value $K_K$ by the increment $\Delta K_{Learn}$. The control unit 13 thereby adapts the desired clutch position $K_S$ automatically for the next sequence. If, by contrast, after the release of the tooth-on-tooth position by means of the second pulse, the control unit 13 detects oscillations in the signal from the sensor 44 or in the rotational speed of the countershaft 25, no variation takes place, that is to say neither an increase nor a reduction in the correction value $K_K$.

In most instances, the control unit 13 releases the tooth-on-tooth position even by means of the first pulse. An adaption of the desired clutch position $K_S$ or of the correction value $K_K'$ takes place only when a clutch position detected by the sensor 23 corresponds to the activated desired clutch travel $K_I$ within the framework of a tolerance band stored in the storage unit 41. For this purpose, after a time span of, for example, 80 ms stored in the storage unit 41 has elapsed, the control unit 13 checks whether the detected clutch position has reached a stored percentage, for example 80%, of the activated desired clutch travel $K_I$ or of the height of the pulse. The control unit 13 thereby evaluates a test value of the desired clutch position $K_S$ as a function of a reaction signal.

Figure 4:
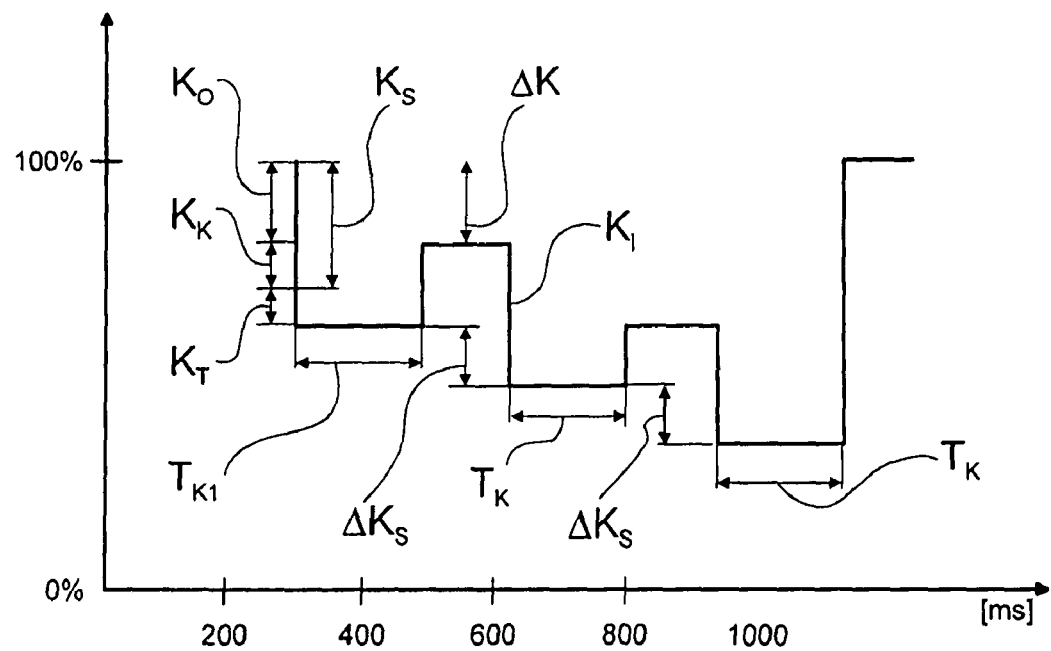
FIG. 4 shows a time profile of an activated clutch travel during an operation for determining a desired clutch position in order to generate a torque pulse when the motor vehicle is moving, and, FIG. 5 shows a time profile of an activated clutch travel during an operation for determining a desired clutch position in order to generate a torque pulse in a safety mode.
Figure 5:
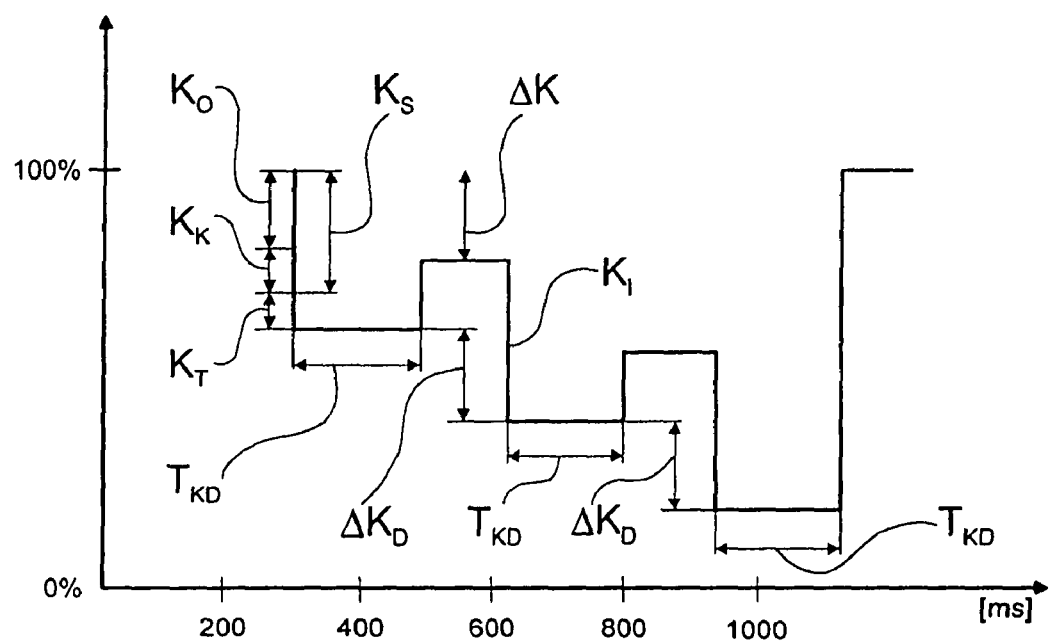

FIGS. 4 and 5 show the profile of the desired clutch travel $K_I$ in further operating states of the motor vehicle. The description will deal only with differences from the sequence illustrated in FIG. 3.

FIG. 4 shows a test sequence or the sequence in a safety mode, which is distinguished by lower, more careful values $\Delta K_S$ of the steps for increasing the total of three pulses. The control unit 13 always starts the sequence in the safety mode after an ignition of the internal combustion engine 16. If the tooth-on-tooth position is successfully released during the execution of the test sequence in the safety mode, the control unit 13 stores the successful pulse height in an intermediate storage location. Then, when a tooth-on-tooth position occurs anew, the control unit 13 starts the safety mode a second time and calculates the desired clutch position $K_S'$ or the correction value $K_K$ as an average value of the two successful pulse height minus the temperature addition $K_T$.

FIG. 5 shows the sequence during driving, which is distinguished by a value $\Delta K_D$ of the steps for increasing the pulses which is higher than the value $\Delta K$ and than the value $\Delta K_S$. If a rotational speed of the internal combustion engine 16 is already in a desired rotational speed band after the release of the tooth-on-tooth position, the control unit 13 closes the clutch completely, instead of opening it, as in the operating situations described above. Furthermore, the pulse duration $T_{KD}$ is different from the pulse duration $T_{K1}$ and from the pulse duration $T_K$. A maximum number of pulses during driving is determined as a function of the pulse duration $T_{KD}$. The control unit 13 thereby determines an amount of the torque pulse as a function of an operating state of the motor vehicle. A matching of the correction value $K_K$ does not take place during driving.

What is claimed is:

1. A motor vehicle transmission control device having a means (10) for establishing or releasing an engagement of a toothing or of jaws (11) of a motor vehicle transmission (12), and a clutch (14) suitable for transmitting a torque to a first component (15) of the toothing (11), said control unit (13) controlling actuating of the clutch (14) and being capable of briefly adjusting the clutch (14), for the purpose of releasing a tooth-on-tooth position of the toothing (11), to a desired clutch position ($K_S$) in which the clutch (14) transmits a torque pulse to the first component (15) of the toothing (11), said control unit (13) providing the desired clutch position ($K_S$) as a function of a reaction signal of the motor vehicle transmission (12) triggered by a control signal provided by the control unit (13).

2. The motor vehicle transmission control device as claimed in claim 1, wherein the control unit (13) is provided for increasing, in steps, the desired clutch position ($K_S$) assigned to a torque pulse, until an engagement of the toothing (11) is reached.

3. The motor vehicle transmission control device as claimed in claim 2, comprising a storage unit (41) for storing a desired clutch travel ($K_I$) occurring when the threshold value is overshot.

4. The motor vehicle transmission control device as claimed in claim 1, wherein the control unit (13) is provided for determining an amount of the torque pulse as a function of an operating state of the motor vehicle transmission (12).

5. The motor vehicle transmission control device as claimed in claim 2, wherein the control unit (13) is provided for determining a value ($\Delta K$, $\Delta K_S$, $\Delta K_D$) of a step increase as a function of an operating state of the motor vehicle transmission (12).

6. The motor vehicle transmission control device as claimed in claim 1, wherein the control unit (13) is provided for carrying out an adaption of the desired clutch position ($K_S$) in a safety mode.

7. The motor vehicle transmission control device as claimed in claim 6, wherein, in the safety mode, the control unit (13) determines a reduced value ($\Delta K_S$) of the increase step.

8. The motor vehicle transmission control device as claimed in claim 1, wherein the control unit (13) includes means for evaluating a test value of the desired clutch position ($K_S$) as a function of the reaction signal from the motor vehicle transmission (12).

9. The motor vehicle transmission control device as claimed in claim 1, wherein the control unit (13) is provided for detecting a temperature of the clutch (14) and for correcting the desired clutch position ($K_S$) as a function of the detected temperature.

10. The motor vehicle transmission control device as claimed in claim 1, wherein the control unit (13) is provided for adapting the desired clutch position ($K_S$) automatically in a test operation.

11. A method for operating a motor vehicle transmission (12) having a means (10) for establishing and releasing an engagement of a toothing (11) of the motor vehicle transmission (12), a clutch (14) to be actuated via a control unit (13), the clutch (14) being suitable for transmitting a torque to a component (15) of the toothing (11), said method comprising the steps of: for the purpose of releasing a tooth-on-tooth position of the toothing (11), briefly providing a control signal for adjusting the clutch (14) to a desired clutch position ($K_S$) in order to generate a torque pulse, determine a reaction of the motor vehicle transmission (12) in response to the control signal from the control unit (13), and adapting the desired clutch position ($K_S$) as a function of the reaction.

* * * * *